(12) United States Patent
Fay et al.

(10) Patent No.: US 9,361,714 B2
(45) Date of Patent: Jun. 7, 2016

(54) ENHANCED VIDEO DESCRIPTION

(71) Applicant: GLOBALFOUNDRIES Inc., Grand Cayman (KY)

(72) Inventors: Peter Fay, Westford, MA (US); Richard Scott Schwerdtfeger, Austin, TX (US); Elizabeth Vera Woodward, Austin, TX (US); Shunguo Yan, Austin, TX (US)

(73) Assignee: GlobalFoundries Inc., Grand Cayman (KY)

( * ) Notice: Subject to any disclaimer, the term of this patent is extended or adjusted under 35 U.S.C. 154(b) by 357 days.

(21) Appl. No.: 13/959,697

(22) Filed: Aug. 5, 2013

(65) Prior Publication Data
US 2015/0035835 A1 Feb. 5, 2015

(51) Int. Cl.
*G06T 11/20* (2006.01)
*G06K 9/00* (2006.01)
*H04N 21/8547* (2011.01)

(52) U.S. Cl.
CPC .......... *G06T 11/206* (2013.01); *G06K 9/00671* (2013.01); *G06K 9/00744* (2013.01); *H04N 21/8547* (2013.01)

(58) Field of Classification Search
CPC ....... G06K 9/00671; G06K 9/00744–9/00751; G06T 19/006; H04N 21/8547
See application file for complete search history.

(56) References Cited

U.S. PATENT DOCUMENTS

| | | | |
|---|---|---|---|
| 6,490,370 B1 * | 12/2002 | Krasinski .......... | G06F 17/30817 345/418 |
| 7,143,434 B1 | 11/2006 | Paek et al. | |
| 7,199,798 B1 | 4/2007 | Echigo et al. | |
| 7,757,157 B1 | 7/2010 | Fukuda | |
| 2007/0106516 A1 * | 5/2007 | Larson .................. | G10L 13/033 704/270 |
| 2009/0043816 A1 | 2/2009 | Youm | |
| 2011/0176788 A1 * | 7/2011 | Bliss .................... | G11B 27/105 386/241 |
| 2012/0201472 A1 * | 8/2012 | Blanchflower ..... | G06K 9/00671 382/224 |
| 2014/0143218 A1 * | 5/2014 | Sanghavi .......... | G06F 17/30038 707/695 |

FOREIGN PATENT DOCUMENTS

| | | |
|---|---|---|
| CN | 101489125 | 1/2009 |
| JP | 2004289598 | 3/2003 |

OTHER PUBLICATIONS

Vaquero, et al., "People Search in Surveillance Videos," www.cs.ucsb.edu/~daniel.
IP.com, "Content-type based real-time video editing for broadcast systems," Oct. 26, 2007, pp. 1-3. http://www.ip.com/pubview/IPCOM000159718D.
Vaquero, et al., "People Search in Surveillance Videos," www.cs.ucsb.edu/~daniel, Fourth Graduate Student Workshop on Computing, Oct. 2009.

* cited by examiner

*Primary Examiner* — Charles Tseng
(74) *Attorney, Agent, or Firm* — DeLio, Peterson & Curcio LLC; Peter W. Peterson

(57) ABSTRACT

A method includes a computer creating scene description templates; the computer creating people profiles; analyzing video frames of a video to identify visual elements containing scenes and people; generating timelines for the identified visual elements; matching the identified visual elements with the scene description templates and the people profiles; and combining the matched identified visual elements and the timelines into the video.

20 Claims, 5 Drawing Sheets

| Visual elements of scene Key/index | Name | Category | Scene description or people profile |
|---|---|---|---|
| People profile template | Profile template | People | xxx is <current position> in xxx company, <previous position>. xxx is known for <reason>. |
| Landscape description template | Landscape template | Landscape | xxx type, located in xxxxx. It's used for xxx purpose. Its major characteristic is xxxxx |
| People image  | James Doe | People picture | CEO since January 2012. |
|  | Mountain Alaska | Nature video clip (3 seconds) | Distant harsh mountains are composed of granite, covered with thorny shrubs and acacia trees |
| Animal image | Baby chick | Animal | A one day old baby chick with white short hair-like feather, black round eye wide open, and light yellow beaker |

ENHANCED VIDEO DESCRIPTION

BACKGROUND

The present invention relates to video descriptions, and more specifically, to providing enhanced video descriptions by using scene description templates and people profiles.

Videos and other visual media (such as movie, featured films, video clips) are required to be accessible to people with hearing loss and visual impairment. Videos with speech need to be captioned with alternative text of the speech to help people with hearing loss. Videos, containing important scenes, such as people's gestures, nature, landscape and other background changes, need to provide audio descriptions for the scenes to be played so that a visually impaired user who cannot perceive these visual aspects of the scene can listen to the audio by means of an Assistive Technology (AT, e.g., a screen reader).

SUMMARY

According to one aspect of the present invention, a method includes a computer creating scene description templates; the computer creating people profiles; analyzing video frames of a video to identify visual elements containing scenes and people; generating timelines for the identified visual elements; matching the identified visual elements with the scene description templates and the people profiles; and combining the matched identified visual elements and the timelines into the video.

According to another aspect of the present invention, a computer system includes: one or more processors, one or more computer-readable memories and one or more computer-readable, tangible storage devices; a description template creator operatively coupled to at least one of the one or more storage devices for execution by at least one of the one or more processors via at least one of the one or more memories, configured to create scene templates; a people profile creator operatively coupled to at least one of the one or more storage devices for execution by at least one of the one or more processors via at least one of the one or more memories, configured to create people profiles from a database network; a video preprocessor operatively coupled to at least one of the one or more storage devices for execution by at least one of the one or more processors via at least one of the one or more memories, configured to analyze video frames to identify visual elements; a timeline generator operatively coupled to at least one of the one or more storage devices for execution by at least one of the one or more processors via at least one of the one or more memories, configured to generate timelines for identified visual elements; a matching unit operatively coupled to at least one of the one or more storage devices for execution by at least one of the one or more processors via at least one of the one or more memories, configured to match the identified visual elements with the scene description templates and the people profiles; and a combining unit operatively coupled to at least one of the one or more storage devices for execution by at least one of the one or more processors via at least one of the one or more memories, configured to combine the matched identified visual elements and the timelines into the video.

According to still aspect of the present invention, a computer program product includes: one or more computer-readable, tangible storage medium; program instructions, stored on at least one of the one or more storage medium, to create scene description templates; program instructions, stored on at least one of the one or more storage medium, to create people profiles; program instructions, stored on at least one of the one or more storage medium, to analyze video frames of a video to identify visual elements containing scenes and people; program instructions, stored on at least one of the one or more storage medium, to generate timelines for the identified visual elements; program instructions, stored on at least one of the one or more storage medium, matching the identified visual elements with the scene description templates and the people profiles; and program instructions, stored on at least one of the one or more storage medium, to combine the matched identified visual elements and the timelines to the video.

BRIEF DESCRIPTION OF THE SEVERAL VIEWS OF THE DRAWINGS

FIG. 2 depicts a table according to an embodiment of the present invention.

DETAILED DESCRIPTION

Figure 1:
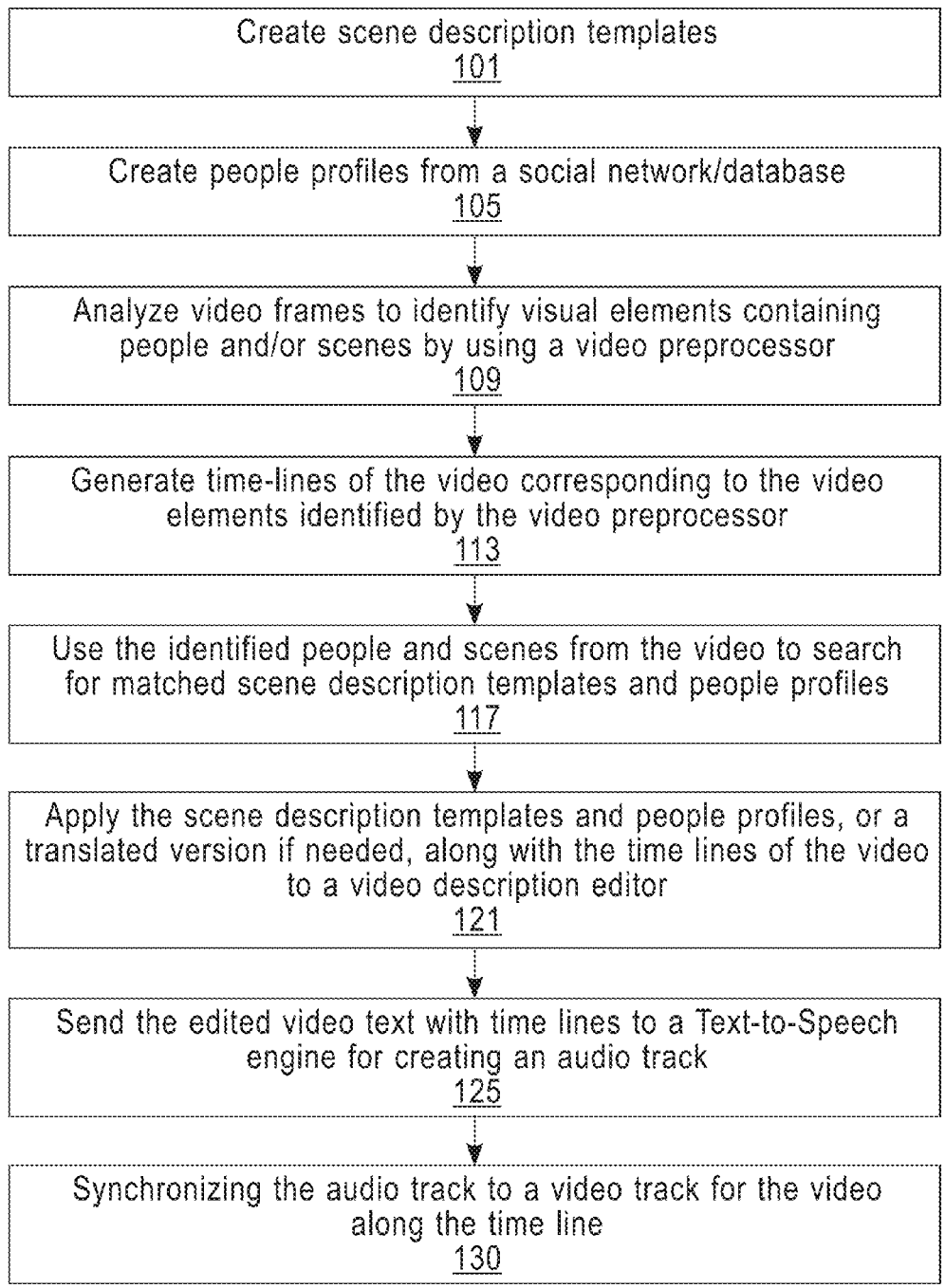
FIG. 1 shows a flowchart according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

With reference now to FIG. 1, a flow chart according to an embodiment of the present invention is depicted. The process includes creating scene descriptions templates (101). Each scene template, either describes or provides a description format or layout (template) for at least one video frame, short video clip and can be searched by using the video frame or clip. The process further includes creating people profiles from either a social network or database (105). Once the scene description templates and people profiles are created, the process analyzes video frames from a video to identify visual elements containing people and/or scenes (109). Once the visual elements have been identified, timelines are generated for the visual elements as they appear in a video (113). A matching process includes using the identified people and scenes from the video to search for matched scene description templates and people profiles (117). Once the matching process has found the corresponding scene description templates and people profiles it is applied to the video as video caption by using a video description editor (121). It is possible to create a translated version of the matched scene description templates and people profiles. The translated version can then be mixed with the timelines into the video using the video description editor (121). The edited video text with the timelines are inputted into a text to speech engine to create an audio track (125). The final process includes synchronizing the audio track to a video track for the video and the timelines (130). Additional details about the process will be explained with reference to FIG. 3.

Figure 3:
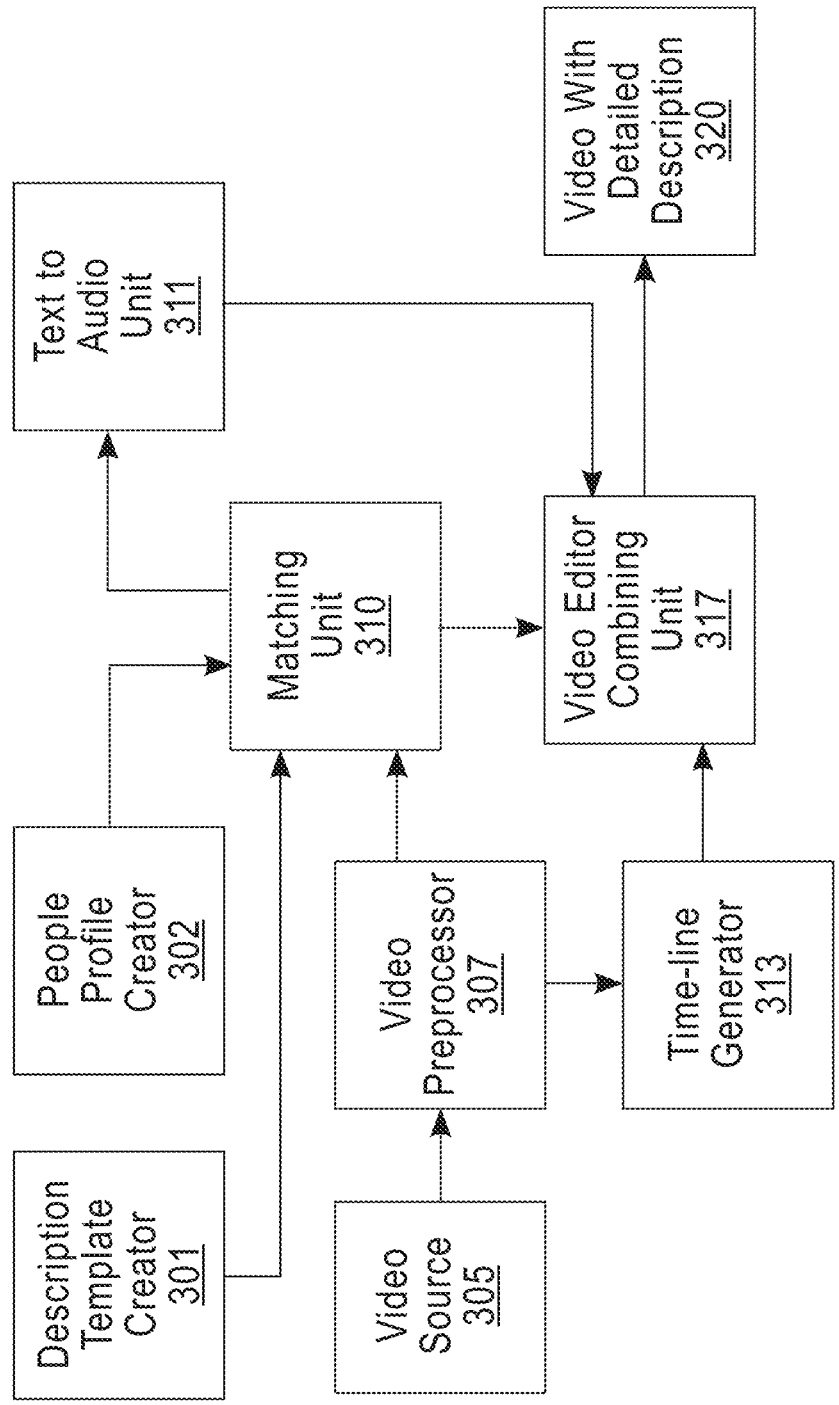
FIG. 3 illustrates a hardware configuration according to an embodiment of the present invention.

Referring to FIGS. 2 and 3, a table (FIG. 2) shows the various visual elements of scene key/indexes, names, categories and the scene descriptions/people profiles. Examples of the visual elements of scene key/indexes include people profile templates, landscape description templates, people images, background scenes and animal images or any recognized object. Each of the visual elements fall into categories such as people, landscape, people picture, nature video clips, common objects, cartoons, application or animals. In an embodiment of the present invention, scene descriptions and people profiles are matched with the visual elements. FIG. 3 shows a hardware configuration according to this embodiment of the present invention.

Still referring to FIG. 3, a description template creator 301 and a people profile creator 302 supplies their respective information to a matching unit 310. Each description template may provide a short "standard" description for a given visual element or a person. Each template may be formatted to specify how a visual element or a person profile should be described. Scene templates and people profiles can be created through crowd sourcing in a social network or a cloud network. The scene templates and people profiles may be categorized and indexed with scene or people's pictures, respectively. Templates or profiles may be arranged in a hierarchical tree structure with more generic categories in the upper level, and more specific ones in the lower level. Each node or leaf in the tree contains a visual scene element or person associated with its description for fast search. For instance, people in an organization can be arranged based on the structure of the organization and its social network (such as company connections). People profiles can be acquired from e-card or personal profile (role, profession, skills, personality etc.) from a variety of sources such as a company's HR database, or the public information found on many websites. Templates or profiles may include hyperlinks to augment the video experience. A user is then able to pause the video and use the link to gain additional information regarding the visual scene elements or people described. Templates may indicate maximum length of a description.

Still with reference to FIG. 3, a video source 305 is supplied to a video preprocessor 307. The video source can be any video information and can come from a variety of sources. The video preprocessor 307 analyzes video frames from the video source 305 to identify visual elements containing people and/or scenes. Once the video preprocessor 307 identifies the visual elements it supplies this information to the matching unit 310 and a timeline generator 313. The timeline generator 313 generates timelines for each of the identified visual elements in the order they appear in the video. The matching unit 310 then uses the identified people and scenes from the video to search for matched scene description templates and people profiles. Any matched scene description templates and people profiles and the corresponding timelines are applied to the video by using a video editor combining unit 317. Various technologies can be used for the matching, for instance, face recognition, imaging matching, or video frame matching etc. Visual element or scene match starts from a specific category, or a leaf in a branch of a hierarchical tree structure. To further enhance the video, the matched scene description templates and people profiles are supplied to a video description editor for editing, and the edited texts are supplied to a text to audio unit 311. The audio file is also mixed into the video by using the video combining unit 317. The final video 320 includes all of the detailed descriptions and timelines.

Figure 4:
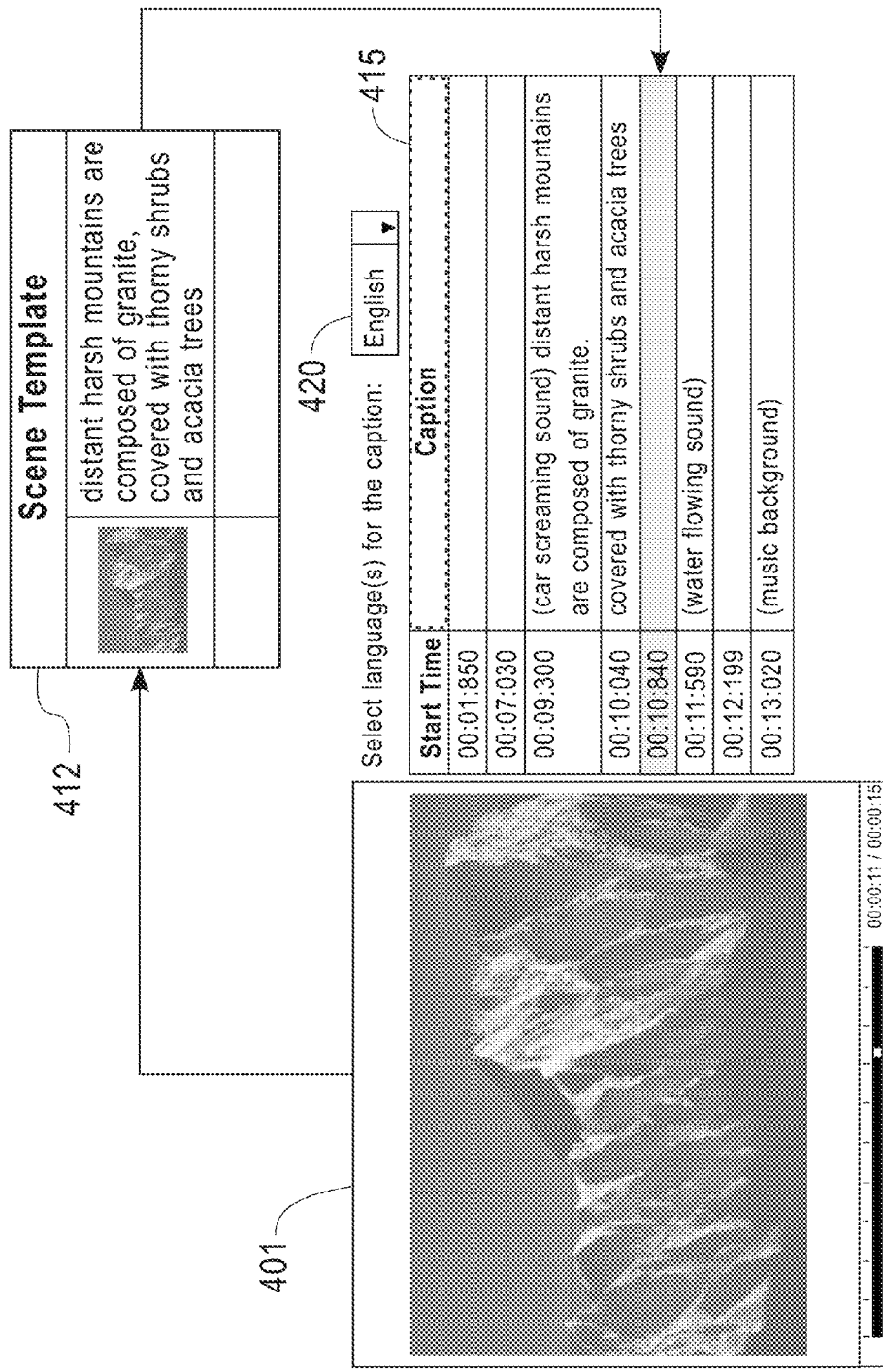
FIG. 4 shows an exemplary implementation according to an embodiment of the present invention.

Referring to FIG. 4, an exemplary implementation according to an embodiment of the present invention is depicted. A video 401 is matched with a scene template 412. The scene description template 412 is matched to the corresponding timeline 415. A feature of the exemplary implementation includes a language selection button 420. A completion indicator may be included to identify to what degree each template is completed. For crowd-sourcing purposes, individuals are able to quickly identify which templates are least completed and require attention. Individuals are able to select templates with a certain percentage of completion to quickly move to those requiring attention. A configuration option can also be set up to send a draft to the owner of the video for approval prior to the audio track being created and synthesized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
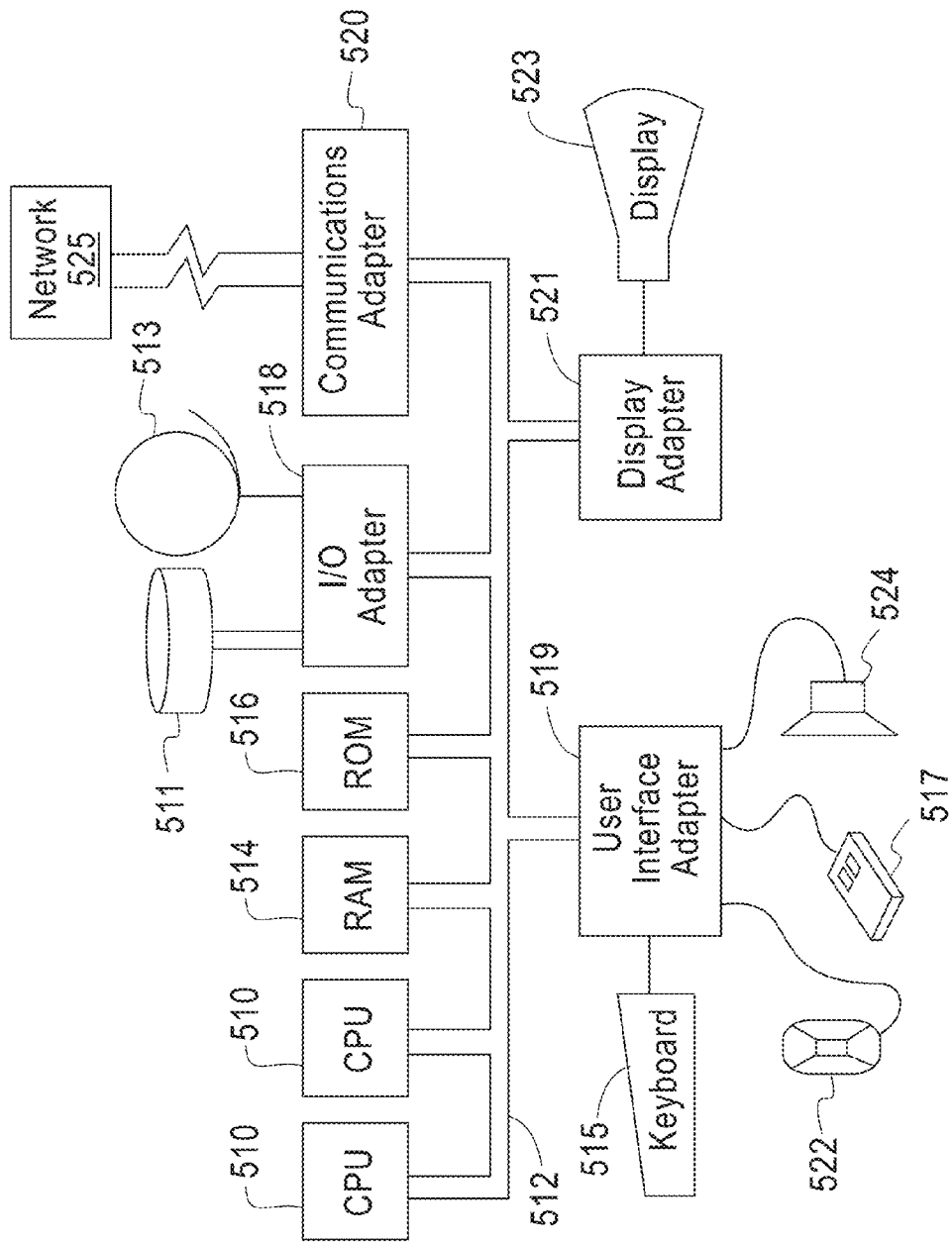
FIG. 5 illustrates an overall hardware configuration according to an embodiment of the present invention.

Referring now to FIG. 5, this schematic drawing illustrates an overall hardware configuration of an information handling/computer system in accordance with the embodiments of the invention. The system comprises at least one processor or central processing unit (CPU) 510. The CPUs 510 are interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of the embodiments of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:

creating, by a computer, scene description templates, the scene description templates being arranged in a first hierarchical tree structure having an upper level and a lower level and containing a more generic category in the upper level and a more specific category in the lower level, the scene description templates being formatted to specify how a scene element should be described and further containing identification of an associated scene element;

creating, by the computer, people profiles, the people profiles being arranged in a second hierarchical tree structure having an upper level and a lower level and containing a more generic category in the upper level and a more specific category in the lower level, the people profiles being formatted to specify how a person should be described and further containing identification of an associated person;

analyzing, by the computer, video frames of a video to identify visual elements containing scenes and people;

generating, by the computer, timelines for the identified visual elements;

matching, by the computer, the identified visual elements of scenes and people with the scene description templates and the people profiles using the first hierarchical tree structure of the scene description templates and the second hierarchical tree structure of the people profiles; and combining, by the computer, the matched identified visual elements of scenes and people and the timelines into the video, the video including identifications and descriptions of matched scenes and people.

2. The method according to claim 1, wherein the analyzing of the video frames is performed by using a video preprocessor.

3. The method according to claim 1, wherein the combining of the matched identified visual elements and the timelines is performed by using a video description editor.

4. The method according to claim 1, further comprising generating a translated version of the identified visual element's description.

5. The method according to claim 4, further comprising combining the translated version and the timelines by using a video description editor.

6. The method according to claim 5, further comprising creating an audio track from the combined translated version and the timelines.

7. The method according to claim 6, further wherein the audio track is created by using a text to speech engine.

8. The method according to claim 6, further comprising synchronizing the audio track with a video track for the video along the timelines.

9. The method according to claim 1, wherein the people profiles include an organization with which a person is associated, and the video includes identification of the organization of matched people.

10. The method according to claim 1, further including indicating degree of completion of scene description templates, and permitting users to identify which templates are not completed.

11. A computer system comprising:

one or more processors, one or more computer-readable memories and one or more computer-readable, tangible storage devices;

a description template creator operatively coupled to at least one of the one or more storage devices for execution by at least one of the one or more processors via at least one of the one or more memories, configured to create scene description templates, the scene description templates being arranged in a first hierarchical tree structure having an upper level and a lower level and containing a more generic category in the upper level and a more specific category in the lower level, the scene description templates being formatted to specify how a scene element should be described and further containing identification of an associated scene element;

a people profile creator operatively coupled to at least one of the one or more storage devices for execution by at least one of the one or more processors via at least one of the one or more memories, configured to create people profiles from a database network, the people profiles being arranged in a second hierarchical tree structure having an upper level and a lower level and containing a more generic category in the upper level and a more specific category in the lower level, the people profiles being formatted to specify how a person should be described and further containing identification of an associated person;

a video preprocessor operatively coupled to at least one of the one or more storage devices for execution by at least one of the one or more processors via at least one of the one or more memories, configured to analyze video frames to identify visual elements;

a timeline generator operatively coupled to at least one of the one or more storage devices for execution by at least one of the one or more processors via at least one of the one or more memories, configured to generate timelines for identified visual elements;

a matching unit operatively coupled to at least one of the one or more storage devices for execution by at least one of the one or more processors via at least one of the one or more memories, configured to match the identified visual elements of scenes and people with the scene description templates and the people profiles using the first hierarchical tree structure of the scene description templates and the second hierarchical tree structure of the people profiles; and a combining unit operatively coupled to at least one of the one or more storage devices for execution by at least one of the one or more processors via at least one of the one or more memories, configured to combine the matched identified visual elements of scenes and people and the timelines into the video, the video including identifications and descriptions of matched scenes and people.

12. The system according to claim 11, wherein the combining of the matched identified visual elements and the timelines is performed by using a video editor.

13. The system according to claim 11, further comprising a translator generating a translated version of the identified visual elements.

14. The system according to claim 13, further comprising using a video editor to combine the translated version and the timelines.

15. The system according to claim 14, further comprising using an audio generation unit to create an audio track from the combined translated version and the timelines, the audio generation unit using a text to speech engine.

16. The system according to claim 15, further comprising a synchronizing unit to synchronize the audio track with a video track for the video along the timelines.

17. A computer program product comprising:

one or more non-transitory computer-readable, tangible storage medium;

program instructions, stored on at least one of the one or more non-transitory storage medium for execution by a processor, to create scene description templates, the scene description templates being arranged in a first hierarchical tree structure having an upper level and a lower level and containing a more generic category in the upper level and a more specific category in the lower level, the scene description templates being formatted to specify how a scene element should be described and further containing identification of an associated scene element;

program instructions, stored on at least one of the one or more non-transitory storage medium for execution by the processor, to create people profiles, the people profiles being arranged in a second hierarchical tree structure having an upper level and a lower level and containing a more generic category in the upper level and a more specific category in the lower level, the people profiles being formatted to specify how a person should be described and further containing identification of an associated person;

program instructions, stored on at least one of the one or more non-transitory storage medium for execution by the processor, to analyze video frames of a video to identify visual elements containing scenes and people;

program instructions, stored on at least one of the one or more non-transitory storage medium for execution by the processor, to generate timelines for the identified visual elements;

program instructions, stored on at least one of the one or more non-transitory storage medium for execution by the processor, matching the identified visual elements of scenes and people with the scene description templates and the people profiles using the first hierarchical tree structure of the scene description templates and the second hierarchical tree structure of the people profiles; and program instructions, stored on at least one of the one or more non-transitory storage medium for execution by the processor, to combine the matched identified visual elements of scenes and people and the timelines to the video, the video including identifications and descriptions of matched scenes and people.

18. The computer program product according to claim 17, wherein the analyzing of the video frames is performed by using a video preprocessor.

19. The computer program product according to claim 17, wherein the combining of the matched identified visual elements and the timelines is performed by using a video editor.

20. The computer program product according to claim 17, further comprising program instructions, stored on at least one of the one or more non-transitory storage medium for execution by the processor, to generate a translated version of the identified visual elements and program instructions, stored on at least one of the one or more non-transitory storage medium for execution by the processor, to combine the translated version and the timelines by using a video editor.

\* \* \* \* \*